United States Patent
Molnar et al.

(10) Patent No.: US 8,032,102 B2
(45) Date of Patent: Oct. 4, 2011

(54) RECEIVER SECOND ORDER INTERMODULATION CORRECTION SYSTEM AND METHOD

(75) Inventors: Alyosha Molnar, Ithaca, NY (US); Morten Damgaard, Laguna Hills, CA (US); Geoff Hatcher, Irvine, CA (US); Kenneth Chai-en Wu, Irvine, CA (US)

(73) Assignee: Axiom Microdevices, Inc., Woburn, MA (US)

( * ) Notice: Subject to any disclaimer, the term of this patent is extended or adjusted under 35 U.S.C. 154(b) by 908 days.

(21) Appl. No.: 12/008,888

(22) Filed: Jan. 15, 2008

(65) Prior Publication Data

US 2009/0181633 A1    Jul. 16, 2009

(51) Int. Cl.
*H04B 1/10* (2006.01)
(52) U.S. Cl. .................. 455/295; 455/296; 455/63.1
(58) Field of Classification Search .............. 455/63.1, 455/226.1, 227, 230, 250.1, 296, 295; 375/346
See application file for complete search history.

(56) References Cited

U.S. PATENT DOCUMENTS

| | | | |
|---|---|---|---|
| 4,383,334 A * | 5/1983 | Epsom | ............................ 455/295 |
| 5,749,051 A | 5/1998 | Dent | |
| 6,408,168 B1 | 6/2002 | Sessink | |
| 6,535,725 B2 | 3/2003 | Hatcher et al. | |
| 7,346,134 B2 * | 3/2008 | Smith | ............................ 375/346 |
| 7,773,967 B2 * | 8/2010 | Smith | ............................ 455/295 |
| 2003/0021367 A1 | 1/2003 | Smith | |
| 2009/0068974 A1 * | 3/2009 | Smith | ............................ 455/304 |

FOREIGN PATENT DOCUMENTS

JP    2001044862    2/2001

OTHER PUBLICATIONS

International Preliminary Report on Patentability, mailed Jul. 29, 2010 (7 pgs.).
Search Report and Written Opinion for PCT/US2009/031108, mailed Jul. 10, 2009, 8 pgs.

* cited by examiner

*Primary Examiner* — Blane J Jackson
(74) *Attorney, Agent, or Firm* — Jackson Walker L.L.P.; Christopher J. Rourk

(57) ABSTRACT

A system for correcting a second order intermodulation product in a direct conversion receiver is provided. The system includes a cross-covariance system receiving a data signal and a second order intermodulation estimate signal and generating a cross-covariance value. An auto-covariance system receives the second order intermodulation estimate signal and generates an auto covariance value. A buffer system stores a second order intermodulation product correction factor. A divider receives the cross-covariance value, the auto-covariance value and the second order intermodulation product correction factor and generates a running average second order intermodulation product correction factor.

20 Claims, 4 Drawing Sheets

RECEIVER SECOND ORDER INTERMODULATION CORRECTION SYSTEM AND METHOD

FIELD OF THE INVENTION

The present invention relates to radio frequency receivers, and more particularly to a receiver second order intermodulation product correction system and method, such as for use with a direct conversion receiver.

BACKGROUND OF THE INVENTION

In a direct-conversion receiver, second-order distortion can occur that results in demodulation of the amplitude of the transmitted signal and generates unwanted signals in the baseband. This distortion becomes a problem if a strong out-of-band blocker is present when the strength of the desired signals is small, such that the receiver is set with large gain. While SAW filters can be used to remove such distortion, SAW filters are large and are generally implemented as off-chip modules, which increases the size and complexity of a receiver.

SUMMARY OF THE INVENTION

Therefore, a receiver second order intermodulation product correction system and method are provided that eliminate the need for off-chip filters. In particular, an estimate of the second order intermodulation product for a current transmission slot is used to update a second order intermodulation product correction factor for a subsequent transmission slot.

In accordance with an exemplary embodiment of the invention, a system for correcting a second order intermodulation product in a direct conversion receiver is provided. The system includes a cross-covariance system receiving a data signal and a second order intermodulation estimate signal and generating a cross-covariance value. An auto-covariance system receives the second order intermodulation estimate signal and generates an auto covariance value. A buffer system stores a second order intermodulation product correction factor. A divider receives the cross-covariance value, the auto-covariance value and the second order intermodulation product correction factor and generates a running average second order intermodulation product correction factor.

The present invention provides many important technical advantages. One important technical advantage of the present invention is a second order intermodulation product correction system and method that eliminates the need for off-chip filters.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
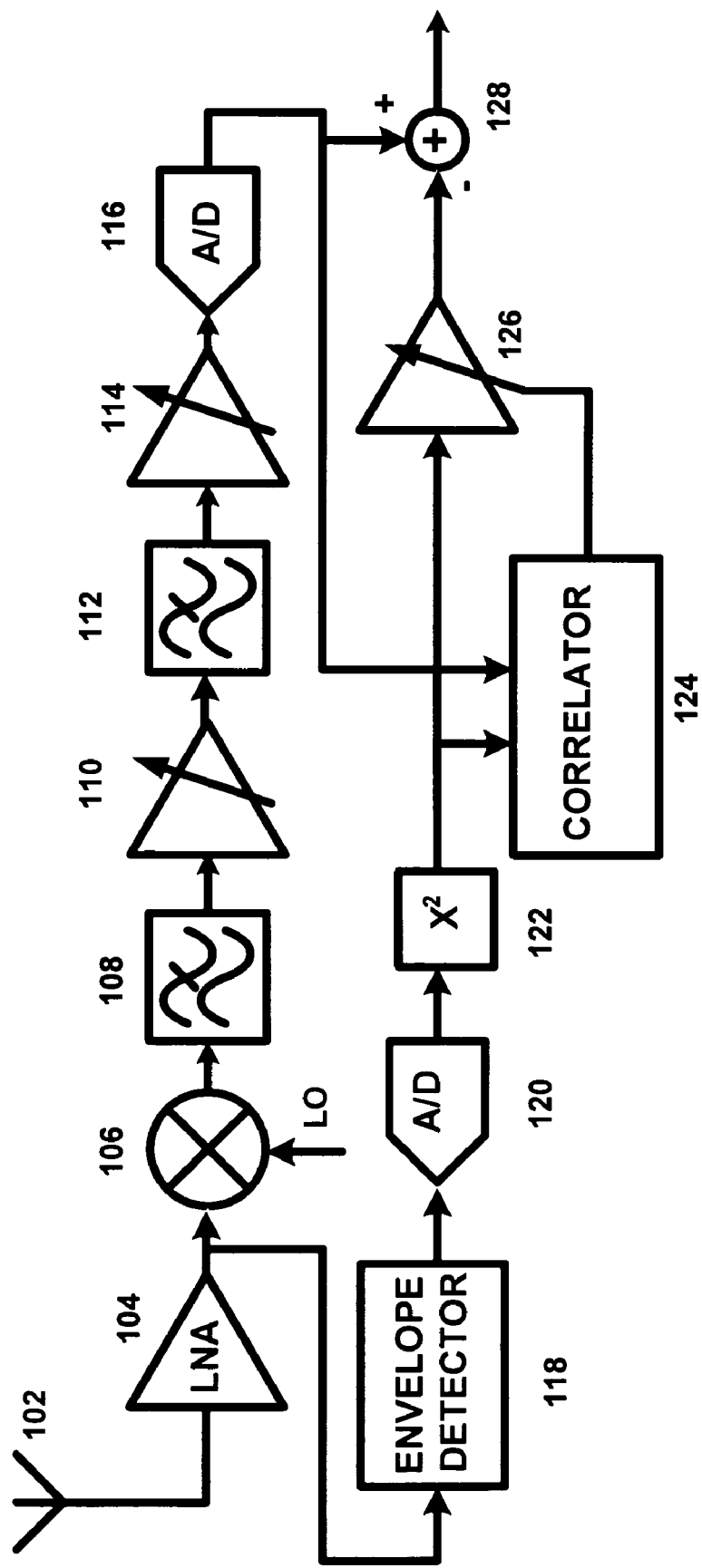
FIG. 1 is a diagram of a system for a receiver with second order intermodulation product correction in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a system 100 for a receiver with second order intermodulation product correction in accordance with an exemplary embodiment of the present invention. In one exemplary embodiment, system 100 can be used in direct conversion systems, so as to remove second order intermodulation product effects created by blocker signals by using a running estimate of the correction factor for successive transmission slots, or in other suitable applications.

System 100 includes antennae 102, which receives a transmitted signal. The transmitted signal is amplified by low noise amplifier (LNA) 104 and is provided to mixer 106 which extracts the baseband signal from the transmitted signal, such as by mixing the received signal with a local oscillator signal LO.

The baseband signal output by mixer 106 is provided to filter 108, which can be an analog infinite impulse response (IIR) filter or other suitable filters, and adaptive gain unit 110, which provide DC offset correction. In one exemplary embodiment, in a direct conversion receiver, the large gain of the analog baseband can cause small DC offsets that can saturate subsequent stages and substantially increase the dynamic range requirements for analog to digital conversion. Periodic DC offset correction can be performed in the analog domain by accumulating the output of a sigma-delta analog to digital converter before the received slot begins, to get an estimate of the DC offset. This offset can then be subtracted in a current mode at the output of filter 108. This procedure can be repeated after a predetermined settling time to the output of filter 112.

Filter 112, which can be an analog IIR filter or other suitable filters, and adaptive gain unit 114 form a bandwidth calibration stage. Process and temperature variations can cause frequencies to vary up to approximately plus or minus 20% due to variations in sheet resistance, capacity, density or other variables. Therefore, periodic calibration can be performed to ensure that the bandwidth of filter 112 is correct. In one exemplary embodiment, calibration can be implemented by switching capacitors in or out in a binary weighted capacitor bank, or in other suitable manners.

The offset corrected and bandwidth calibrated signal is provided to analog to digital converter 116, which converts the analog signal to a digital signal having a suitable word size. The output from analog to digital converter is then provided to correlator 124 and summation unit 128. In one exemplary embodiment, other suitable signal processing, such as direct and quadrature phase signal processing, can also or alternatively be utilized.

The output from low noise amplifier 104 is also provided to envelope detector 118, which generates a peak envelope signal. This signal is provided to analog to digital converter 120, and is then output to multiplier 122 which squares the output of the detected envelope signal. This output is provided to correlator 124 and adaptive gain unit 126.

Correlator 124 receives the intermodulation estimate from multiplier 122 and correlates the estimate to the received signal. The output of correlator 124 is provided to adaptive gain unit 126 where an adaptive gain factor is applied in order to remove the intermodulation component.

In one exemplary embodiment, the effect of the second-order intermodulation product (IP2) on the received signal can be corrected by calculating a running average of a second-order distortion coefficient $a_2$ for both the direct and quadrature phase components, which is estimated and updated at the end of every received transmission slot. The newly updated $a_2$ can then be used to compensate the next slot's second-order distortion. The following exemplary moving average method can be used to calculate the new value for $a_2$:

$$a_2(k+1) = \lambda \cdot a_2(k) + (1-\lambda) \cdot a_{2\_est}(k)$$

where $a_{2\_est}$ is the coefficient estimation of the current slot, k is the slot index and $\lambda$ is an empirically-determined value between 0 and 1, but typically having a value of 0.5. Likewise, other suitable methods can be used to calculate values for $a_2$.

IP2 correction can be performed using the auto-covariance of the envelope signal s(t) and the cross-covariance between the received direct or quadrature phase signal $\tilde{r}(t)$ and s(t) to calculate $a_{2\_est}$. In one exemplary embodiment, $\tilde{r}(t)$ can be simplified as the summation of the desired signal $\tilde{x}(t)$ and the second-order intermodulation product $m(t) = a_{2\_est} \cdot s(t)$. In this exemplary embodiment, both auto-covariance A and cross-covariance B produce only one sample in the case that both inputs are aligned:

$$A = acov(s(t))$$
$$= \sum_{t=1}^{N} [s(t) - \bar{s}]^2$$
$$= \sum_{t=1}^{N} s^2(t) - 2\bar{s} \sum_{t=1}^{N} s(t) + N \cdot \bar{s}^2$$
$$= \sum_{t=1}^{N} s^2(t) - N \cdot \bar{s}^2$$

$$B = xcov(s(t), \tilde{r}(t))$$
$$= \sum_{t=1}^{N} [s(t) - \bar{s}] \cdot [\tilde{r}(t) - \bar{\tilde{r}}]$$
$$= \sum_{t=1}^{N} s(t)\tilde{r}(t) - \bar{\tilde{r}} \sum_{t=1}^{N} s(t) - \bar{s} \sum_{t=1}^{N} \tilde{r}(t) + N \cdot \bar{s} \cdot \bar{\tilde{r}}$$
$$= \sum_{t=1}^{N} s(t)\tilde{r}(t) - N \cdot \bar{s} \cdot \bar{\tilde{r}}$$

where N is the length of samples in one slot

Because $\tilde{r}(t) = \tilde{x}(t) + a_{2\_est} \cdot s(t)$, the output of cross-covariance can be expressed as:

$$B = \sum_{t=1}^{N} s(t)\tilde{x}(t) + a_{2\_est} \sum_{t=1}^{N} s^2(t) - N \cdot (\bar{s} \cdot \bar{\tilde{x}} + a_{2\_est}\bar{s}^2)$$
$$= a_{2\_est}\left(\sum_{t=1}^{N} s^2(t) - N \cdot \bar{s}^2\right) + \sum_{t=1}^{N} s(t)\tilde{x}(t) - N \cdot \bar{s} \cdot \bar{\tilde{x}}$$

Because the cross-covariance B between two unrelated signals is much smaller than the auto-covariance A of a signal, the gain estimate for the signal is produced by dividing B with A:

$$\frac{B}{A} = a_{2\_est} + \frac{\sum_{t=1}^{N} s(t)\tilde{x}(t) - N \cdot \bar{s} \cdot \bar{\tilde{x}}}{\sum_{t=1}^{N} s^2(t) - N \cdot \bar{s}^2}$$
$$= a_{2\_est} + \frac{xcov(s(t), \tilde{x}(t))}{acov(s(t))}$$
$$\cong a_{2\_est}$$

When the strength of a blocker signal is too small, IP$_2$ correction can be disabled by setting second-order distortion coefficient $a_2$ to zero instead of updating with estimated value. The decision of turning on/off compensation can be done by comparing the auto-covariance of the blocker signal's amplitude with a predetermined threshold $A_{thr}$. In one exemplary embodiment, the following relationship can be used to determine whether compensation should be disabled:

$$a_2(k+1) = \begin{cases} \lambda \cdot a_2(k) + (1-\lambda) \cdot a_{2\_est}, & \frac{A}{R^2} \geq A_{thr} \\ 0, & \frac{A}{R^2} < A_{thr} \end{cases}$$

Lambda ($\lambda$) is a weighting factor that is used to adjust the weight given in the running average to the current and previous gain estimates. In one exemplary embodiment, lambda can have a value that is determined based on empirical analysis of the operating environment, or can be assigned a default value, such as 0.5. R is selected to match the gain in the receiver path. By dividing A with $R^2$ the comparison is independent of the setting of the gain in the receiver path.

In operation, system 100 corrects a received signal to remove a second order intermodulation product. System 100 allows a direct conversion receiver to be implemented without the use of SAW filters or other off-chip filters, and eliminates potential second order blocker signals through the use of a second order intermodulation product correction process. In this exemplary embodiment, a running average of the second order intermodulation product is derived from the output of an envelope detector that processes the received signal, which is used to estimate the amount of correction required to remove any potential blocker signals that may be present in the signal after processing by the receiver.

Figure 2:
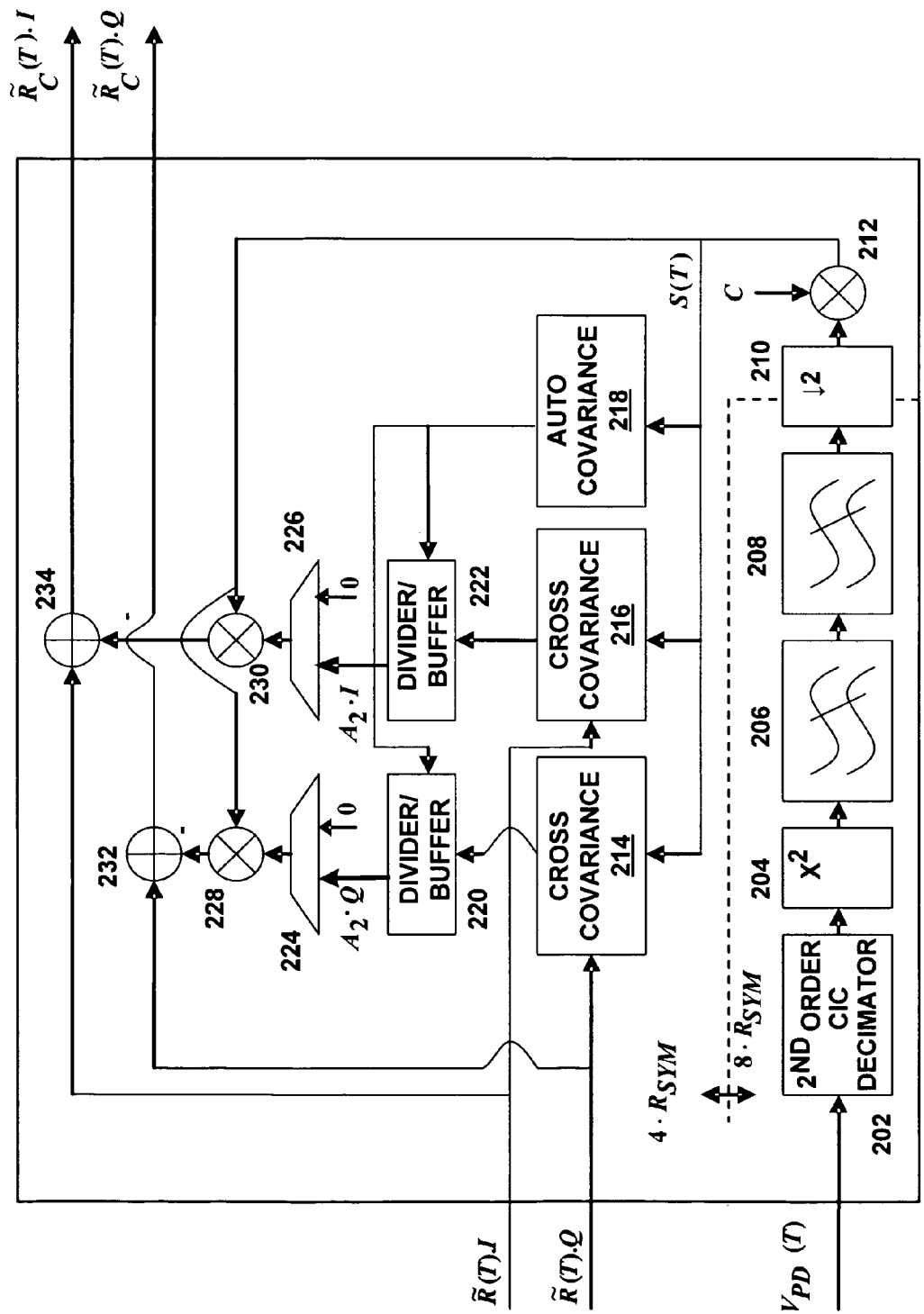
FIG. 2 is a diagram of a system for performing second order intermodulation product correction in accordance with an exemplary embodiment of the present invention.

FIG. 2 is a diagram of a system 200 for performing second order intermodulation product correction in accordance with an exemplary embodiment of the present invention. System 200 can be implemented in hardware, software or a suitable combination of hardware and software and can be one or more software systems operating on a digital signal processing platform or other suitable processing platforms. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 200 includes second order cascaded integrator-comb (CIC) decimator 202. Second order CIC decimator 202 receives the received transmitted signal after amplification by a suitable low noise amplifier and generates an envelope of the signal, which is used to estimate the peak voltage of the received signal. The output of second order CIC decimator 202 is provided to multiplier 204, which squares the output. The squared output is then provided to filter stages 206 and 208, which can be IIR filters or other suitable filters, and which introduce a delay equal to the delay created by the receiver stage, so as to allow the detected peak signal to be compared to the processed received signal. The output of filters stages 206 and 208 is provided to down sampler 210, which down samples the data rate of the received signal so as to match the output from the receiver stage.

The output of down sampler 210 is then multiplied by a compensation factor C by multiplier 212. In one exemplary embodiment, the compensation factor is used to correct for mismatches between the receiver path and the peak director path, such as from second order CIC decimator 202 gain difference and the extra gain in the receiver path. The output of multiplier 212 is then provided to cross covariance calculators 214 and 216, auto covariance calculator 218, and mixers 228 and 230.

Cross covariance calculators 214 and 216 generate a cross covariance estimate for the received quadrature phase and in phase signals, respectively. Other suitable signal formats can also or alternatively be utilized. Auto covariance calculator 218 generates an auto covariance estimate for the received envelope detector output. The output of the quadrature and direct phase covariance product from cross covariance calculators 214 and 216, respectively, is provided to divider/buffers 220 and 222, respectively, which divide the output of cross covariance calculators 214 and 216 by the output from auto covariance calculator 218, to generate a second order direct and quadrature phase output. In addition, divider/buffers 220 and 222 retrieve the gain values for the previous slot and calculate a moving average by multiplying the previous slot gain value by a weighting factor lambda, and the current gain value by (1−lambda), and adding the two gain values. The new gain value is buffered for use in calculating the gain value for the next slot. The gain-compensated direct and quadrature phase signals are then provided to multiplexers 224 and 226, respectively, which receive a control input to operate as a switch, such as to generate a zero output if the strength of the blocker signal is too small and second order intermodulation correction is disabled. The output of multiplexers 224 and 226 is multiplied with the detected envelope signal by mixers 228 and 230, respectively. These outputs are then subtracted from the received direct and quadrature phase signals by subtractors 232 and 234, respectively, and the corrected direct and quadrature phase signals are output from subtractors 234 and 232, respectively.

In operation, system 200 performs second order intermodulation product correction on a direct and quadrature phase signal received from a receiver chain by using the envelope of a received signal to generate auto and cross covariance estimates. Likewise, the auto and cross covariance estimates are stored for each successive slot and are updated based on the calculated estimate of the cross and auto covariance.

Figure 3:
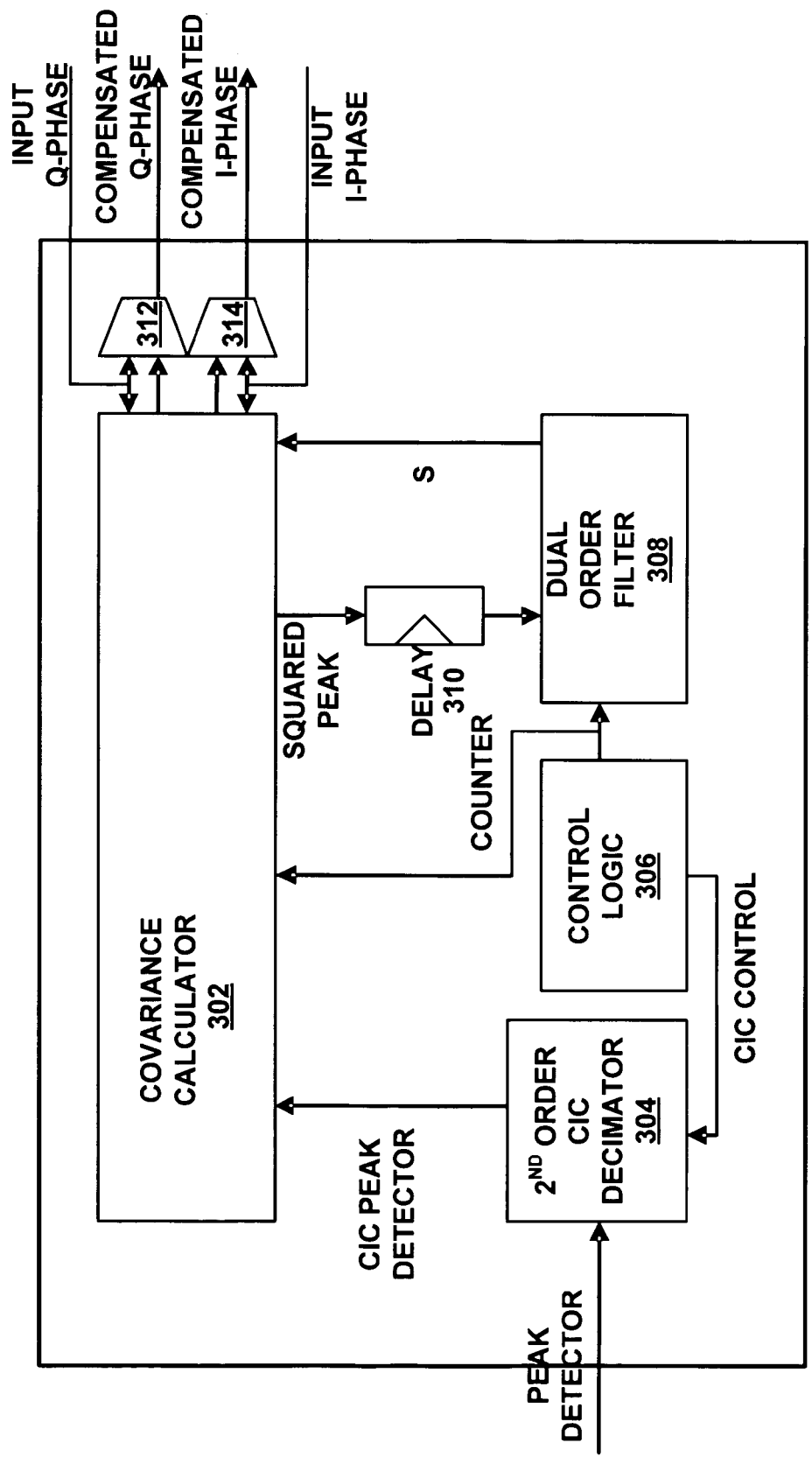
FIG. 3 is a diagram of a system for generating a compensated direct and quadrature phase output to compensate for a second order intermodulation product in accordance with an exemplary embodiment present invention.

FIG. 3 is a diagram of a system 300 for generating a compensated direct and quadrature phase output to compensate for a second order intermodulation product, in accordance with an exemplary embodiment present invention. System 300 can be implemented in hardware, software, or a suitable combination of hardware and software and can be one or more software systems operating on a digital signal processing platform. Likewise, other suitable received signals can also or alternatively be processed, such that system 300 is not limited to quadrature and direct phase signal processing.

System 300 includes covariance calculator 302, which calculates covariance based on output received from a peak detector of the received voltage signal, as well as the direct and quadrature phase input from a receiver chain. Second order CIC decimator 304 receives a peak detector output and generates a CIC peak detector output for input to covariance calculator 302. Control logic 306 controls the operation of second order CIC decimator 304 and dual order filter 308. Likewise, control logic 306 provides a counter signal to covariance calculator 302. Covariance calculator 302 outputs a squared peak value to delay unit 310, which provides a delay to the squared peak value so as to match the timing of the received direct and quadrature phase signals. The output of delay unit 310 is provided to dual order filter 308, which filters the squared peak signal so as to generate a time varying peak detector output to covariance calculator 302. Covariance calculator 302 then uses the input direct and quadrature phase signals and the output of dual order filter 308 to calculate a covariance and to compensate the input direct and quadrature phase signals. In one exemplary embodiment, the compensated direct and quadrature phase signals can be equal to the input direct and quadrature phase signals, such as where it is determined that second order intermodulation product correction should not be applied, as previously discussed.

In operation, system 300 applies second order intermodulation product correction on received direct and quadrature phase signals, by applying a running average of an estimated second order intermodulation product correction gain. Covariance calculator 302 can be implemented using a digital signal processor or other suitable platforms, so as to reduce the number of components required to implement the second order intermodulation product correction factor calculation and application, such as calculation of cross-covariance, auto-covariance, compensation switching based on the received signal strength, and other functions.

Figure 4:
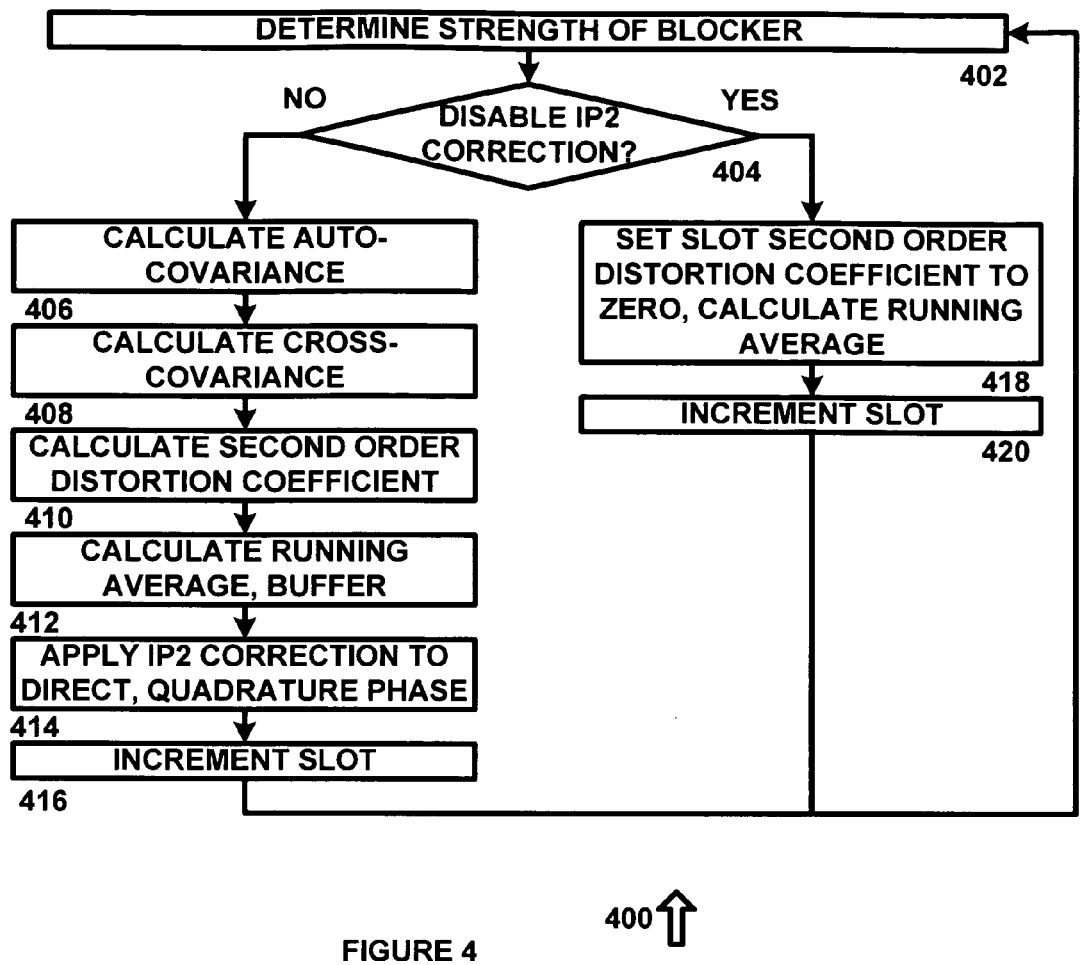
FIG. 4 is a flowchart of a method for applying second order intermodulation product correction in accordance with an exemplary embodiment of the present invention.

FIG. 4 is a flowchart of a method 400 for applying second order intermodulation product correction in accordance with an exemplary embodiment of the present invention. Method 400 can be used to calculate second order intermodulation correction factors for direct and quadrature phase signals in a direct conversion receiver, or for other suitable processes.

Method 400 begins at 402 where the strength of a blocker signal is determined. In one exemplary embodiment, the strength of a blocker can be determined based on the calculated value of the auto covariance divided by a variable that is representative of the gain of the receiver path. If the result of that division operation is greater than or equal to a predetermined setting, then second intermodulation product correction can be applied, whereas if it is below a predetermined limit, then second order intermodulation product correction can be disabled, such as where the strength of the block or signal is too small to require second order intermodulation product correction. The method then proceeds to 404.

At 404, it is determined whether to disable the second order intermodulation product correction. If it is determined that second order intermodulation product correction should be applied, the method proceeds to 406 where auto covariance of the peak detector envelope signal is calculated, such as by using the previously described process or other suitable processes. The method then proceeds to 408 where cross covariance is calculated between the peak detector envelope signal and the received direct and quadrature phase signals, respectively, such as by using the previously described process or other suitable processes. Likewise, other suitable received signals can also or alternatively be used. The method then proceeds to 410 where a second order distortion coefficient is calculated, such as by using the previously described process or other suitable processes. The method then proceeds to 412 where a running average for the second order distortion coefficient for the direct and quadrature phase signals or other suitable signals is calculated, such as by using the previously described process or other suitable processes. The current value of the second order distortion coefficient for the direct and quadrature phase signals or other suitable signals is buffered for use in the next slot calculations, and the method proceeds to 414 where the correction coefficient is applied to the direct and quadrature phase signals or other suitable signals, such as by using the previously described process or other suitable processes. The method then proceeds to 416 where the slot is incremented. The method then returns to 402.

Likewise, if it is determined at 404 that second order distortion correction should be disabled, the method proceeds to 418 where the value for the second order distortion coefficient for the slot is set to zero and the running average is updated and buffered. The method then proceeds to 420 where the slot is incremented, and the method returns to 402.

In operation, the second order intermodulation product for a received signal is corrected by calculating a running average of the second order distortion coefficient for the received signal, such as for direct and quadrature phase components or other suitable signals, which is estimated and updated at the end of every transmission slot using the second order intermodulation correction coefficient from the previous slot. In this manner, the effect of any blocker signals can be estimated and used to control the second order intermodulation product, so as to eliminate the need for SAW filters in a direct conversion receiver.

In view of the above detailed description of the present invention and associated drawings, other modifications and variations are apparent to those skilled in the art. It is also apparent that such other modifications and variations may be effected without departing from the spirit and scope of the present invention.

What is claimed is:

1. A system for correcting a second order intermodulation product in a direct conversion receiver, comprising:
    a cross-covariance system receiving a data signal and a second order intermodulation estimate signal and generating a cross-covariance value;
    an auto-covariance system receiving the second order intermodulation estimate signal and generating an auto covariance value;
    a buffer system storing a second order intermodulation product correction factor; and
    a divider receiving the cross-covariance value, the auto-covariance value and the second order intermodulation product correction factor generating a running average second order intermodulation product correction factor.

2. The system of claim 1 further comprising a multiplier multiplying the second order intermodulation estimate signal and the running average second order intermodulation product correction factor to generate a correction signal.

3. The system of claim 2 further comprising a subtractor subtracting the correction signal from the data signal to generate a corrected data signal.

4. The system of claim 2 further comprising a second order intermodulation estimation system receiving a receiver signal and generating a voltage ltage envelope signal.

5. The system of claim 2 wherein the cross-covariance system, the auto-covariance system, the buffer system and the divider are digital devices.

6. The system of claim 1 wherein the cross-covariance system comprises:
    a direct phase cross-covariance system receiving a direct phase data signal and the second order intermodulation estimate signal and generating a direct phase cross-covariance value; and
    a quadrature phase cross-covariance system receiving a quadrature phase data signal and the second order intermodulation estimate signal and generating a quadrature phase cross-covariance value.

7. The system of claim 1 further comprising a second order intermodulation estimation system receiving a receiver signal and generating a voltage envelope signal.

8. The system of claim 1 wherein the cross-covariance system, the auto-covariance system, the buffer system and the divider are digital devices.

9. A direct conversion receiver comprising:
    an amplifier amplifying a transmitted signal;
    a signal processing stage extracting a data signal from the amplified transmitted signal;
    a second order intermodulation product correction stage receiving the amplified transmitted signal and the data signal and generating a correction signal, wherein the second order intermodulation product correction stage comprises a correlator receiving a second order intermodulation estimate signal and the data signal and generating an adaptive gain control signal, and wherein the second order intermodulation product correction stage comprises an envelope detector generating an envelope signal of the amplified transmitted signal; and
    a correction system subtracting the correction signal from the data signal.

10. The system of claim 9 wherein the second order intermodulation product correction stage comprises a cross-covariance system receiving the data signal and a second order intermodulation estimate signal and generating a cross-covariance value.

11. The system of claim 9 further comprising an adaptive gain unit receiving the second order intermodulation estimate signal and the adaptive gain control signal and generating the correction signal.

12. A method for correcting a second order intermodulation product, comprising:
    generating an auto-covariance signal from a second order intermodulation product data signal;
    generating a cross-covariance signal from the second order intermodulation product signal and a data signal; and
    dividing the cross-covariance signal by the auto-covariance signal to generate a second order intermodulation product correction factor.

13. The method of claim 12 further comprising calculating a running average of the second order intermodulation product correction factor.

14. The method of claim 12 further comprising:
    (a) multiplying a stored second order intermodulation product correction factor by a first weighting factor;
    (b) multiplying the second order intermodulation product correction factor by a second weighting factor; and
    adding the results of steps (a) and (b) to generate an updated second order intermodulation product correction factor.

15. The method of claim 12 further comprising storing the second order intermodulation product correction factor for use in calculating the second order intermodulation product correction factor for a subsequent transmission slot.

16. The method of claim 12 wherein generating the cross-covariance signal from the second order intermodulation product signal and the data signal comprises:
generating a direct phase cross-covariance signal from the second order intermodulation product signal and a direct phase data signal; and
generating a quadrature phase cross-covariance signal from the second order intermodulation product signal and a quadrature phase data signal.

17. A direct conversion receiver comprising:
an amplifier amplifying a transmitted signal;
a signal processing stage extracting a data signal from the amplified transmitted signal;
a second order intermodulation product correction stage receiving the amplified transmitted signal and the data signal and generating a correction signal, wherein the second order intermodulation product correction stage comprises a correlator receiving a second order intermodulation estimate signal and the data signal and generating an adaptive gain control signal, wherein the second order intermodulation product correction stage comprises a cross-covariance system receiving the data signal and a second order intermodulation estimate signal and generating a cross-covariance value; and
a correction system subtracting the correction signal from the data signal.

18. The system of claim 17 wherein the second order intermodulation product correction stage comprises an envelope detector generating an envelope signal of the amplified transmitted signal.

19. The system of claim 17 further comprising an adaptive gain unit receiving the second order intermodulation estimate signal and the adaptive gain control signal and generating the correction signal.

20. The system of claim 17 further comprising an adaptive gain unit receiving the second order intermodulation estimate signal and the adaptive gain control signal and generating the correction signal, and wherein the second order intermodulation product correction stage comprises an envelope detector generating an envelope signal of the amplified transmitted signal.

* * * * *

UNITED STATES PATENT AND TRADEMARK OFFICE
CERTIFICATE OF CORRECTION

| | | |
|---|---|---|
| PATENT NO. | : 8,032,102 B2 | Page 1 of 1 |
| APPLICATION NO. | : 12/008888 | |
| DATED | : October 4, 2011 | |
| INVENTOR(S) | : Alyosha Molnar et al. | |

It is certified that error appears in the above-identified patent and that said Letters Patent is hereby corrected as shown below:

Column 8, line 3, delete "ltage"

Signed and Sealed this
Third Day of January, 2012

David J. Kappos
*Director of the United States Patent and Trademark Office*